(12) United States Patent
Kaye

(10) Patent No.: US 6,786,265 B1
(45) Date of Patent: Sep. 7, 2004

(54) LAMINATING MACHINE

(76) Inventor: Alex J. Kaye, 600 Eastwood Ct., Fond du Lac, WI (US) 54935

( * ) Notice: Subject to any disclaimer, the term of this patent is extended or adjusted under 35 U.S.C. 154(b) by 0 days.

(21) Appl. No.: 10/336,419

(22) Filed: Jan. 3, 2003

Related U.S. Application Data
(60) Provisional application No. 60/345,632, filed on Jan. 3, 2002.

(51) Int. Cl.$^7$ .............................................. B30B 15/00
(52) U.S. Cl. ..................................... 156/555; 156/582
(58) Field of Search ................................ 156/555, 580, 156/582, 583.1, 583.5; 100/155 R, 160, 176, 327

(56) References Cited

U.S. PATENT DOCUMENTS

| | | |
|---|---|---|
| 3,130,828 A | 4/1964 | Maurice |
| 4,200,245 A | 4/1980 | Bugnone |
| 4,259,143 A | 3/1981 | Giulie et al. |
| 4,378,867 A | 4/1983 | Pasqualucci |
| 4,451,320 A | 5/1984 | Marvel |
| 4,517,042 A | 5/1985 | Singer |
| 4,542,812 A | 9/1985 | Westley |
| 4,661,083 A | 4/1987 | Heidenreich et al. |
| 4,706,905 A | 11/1987 | Torres |
| 4,743,325 A | 5/1988 | Miyake |
| 4,813,303 A | 3/1989 | Beezer et al. |
| 4,909,890 A | 3/1990 | Bonnyman |
| 4,921,083 A | 5/1990 | Etscheidt et al. |
| 4,949,634 A | 8/1990 | Riddick |
| 5,086,898 A | 2/1992 | Patton et al. |
| 5,129,497 A | 7/1992 | Kelley |
| 5,135,088 A | 8/1992 | Heidenreich et al. |
| 5,180,042 A | 1/1993 | Ogiso |
| 5,295,909 A | 3/1994 | Heidenreich |
| 5,421,436 A | 6/1995 | Lindner et al. |
| 5,478,159 A | 12/1995 | Schneider et al. |
| 5,520,772 A | 5/1996 | Levitan et al. |
| 5,551,917 A | 9/1996 | Wood |
| 5,617,134 A | 4/1997 | Lamothe |
| 5,639,339 A | 6/1997 | Couillard |
| 5,688,176 A | 11/1997 | Heidenreich et al. |
| 5,927,875 A | 7/1999 | Lau et al. |
| 6,076,413 A | 6/2000 | Verot et al. |
| 6,131,636 A * | 10/2000 | Anderson et al. ............ 156/555 |
| 6,220,328 B1 * | 4/2001 | Pourmand et al. .......... 156/498 |
| 6,435,247 B1 * | 8/2002 | Kerr ............................ 156/555 |

* cited by examiner

Primary Examiner—James Sells
(74) Attorney, Agent, or Firm—Boyle Fredrickson Newholm Stein & Gratz S.C.

(57) ABSTRACT

A laminating machine including an improved laminating pull roll mounting assembly and an improved roll height adjustment mechanism. The roll mounting assembly is formed of a pair of inwardly and downwardly extending slots. The slots include a recess on which one hub of a pull roll can be placed prior to placing the roll into the slot. The recess allows a second roll to be placed on the machine while a first roll is being secured to the machine frame. The second roll is then secured to the frame of the machine by a height adjustment mechanism including a pair of pivoting plates connected to the frame by springs. The springs push the plates upwardly to increase the space between the first and second rolls. A winding mechanism also connected between he frame member and the plates can be selectively operated to adjust the space between the first and second rolls by acting against the bias of the springs.

6 Claims, 8 Drawing Sheets

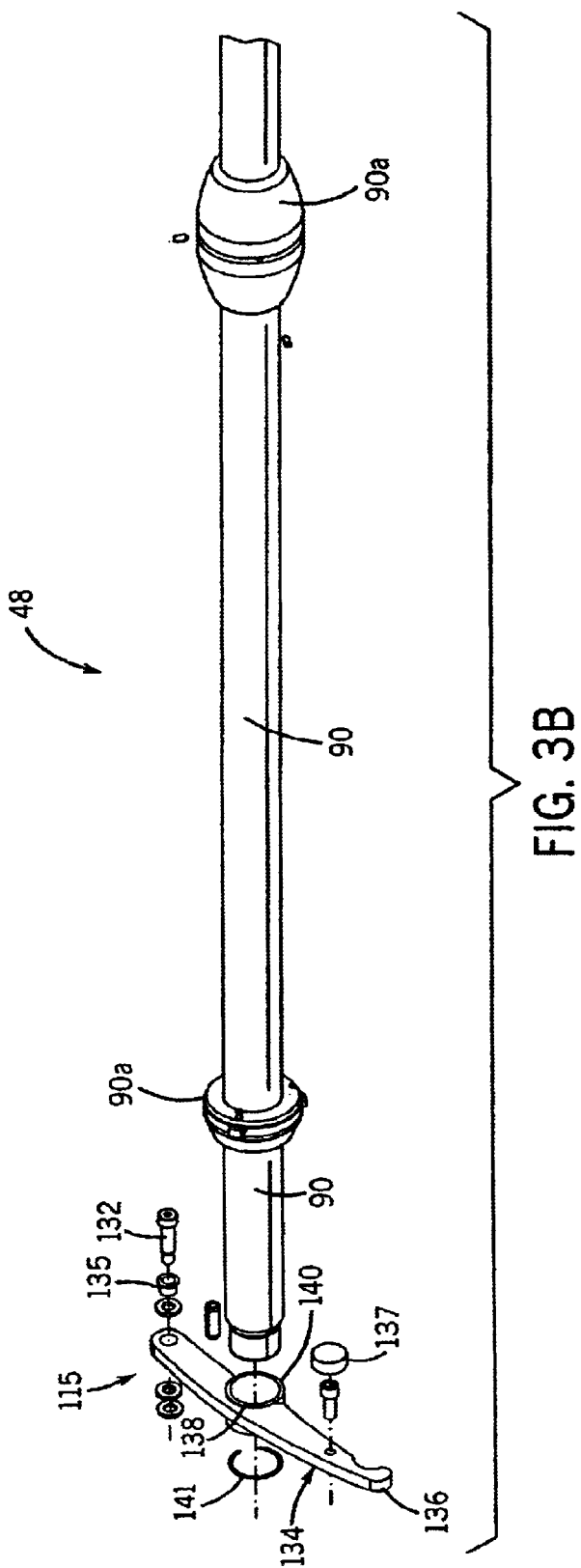

LAMINATING MACHINE

CROSS REFERENCE TO RELATED APPLICATIONS

This application claims priority from U.S. Provisional Patent Application Serial No. 60/345,632, which was filed on Jan. 3, 2002.

FIELD OF THE INVENTION

The present invention relates to laminating machines, and more specifically, to an improved laminating machine which improves the ability to properly tension the laminating media as it is utilized by the laminating machine.

BACKGROUND OF THE INVENTION

Laminating machines are often used to place individual sheets of paper or other material within a protective laminate coating. The coating ensures that the paper enclosed within the coating will remain readable for a much longer period of time than if the paper were not contained within the coating.

The laminating coating material utilized in the laminating process comes from a supply roll removably and rotatably mounted to one of the rollers on the laminating machine frame. When the roll is depleted, it must be replaced with a fresh supply roll containing more of the laminating material for use by the laminating machine. In order to enable the supply roll to be replaced, most prior art laminating machines provide a pair of opposed slots located on opposite sides of the laminating machine frame which are capable of rotationally supporting opposite ends of the supply roll. Once the supply roll is depleted, the depleted roll is lifted and slid outwardly from within the slots and a fresh roll is dropped into and rotationally positioned within the slots. The material supported on the fresh supply roll is then engaged with the laminating machine for use by the machine.

Furthermore, in the laminating process, in order to ensure that the coating coming from the supply roll is properly positioned around the paper without causing wrinkles or bubbles in the coating, the tension applied to the laminate must be carefully controlled. To accomplish this, most laminating machines include a tension adjustment mechanism which enables the machine operator to adjust the tension of the laminate material as it is pulled through the machine to ensure the proper positioning of the paper with respect to the laminate coating and to ensure that the laminate coating does not wrinkle, or become stretched or torn during the laminating process. The tension adjustment mechanisms normally take the form of a slip clutch mechanism located adjacent a driven roller of the laminating machine which contacts and pulls the laminating material. The clutch is mounted to a driven gear and can be adjusted laterally towards and away from the roller. By adjusting the position of the clutch with respect to the driven roller, the slip clutch can selectively engage the driven roller to rotate the roller at any rotational speed between zero and the rotational speed of the driven gear.

Further, many laminating machines have complicated mounting assemblies for the pull rolls extending across the laminating machine between which the laminating material passes. The complex configuration of these assemblies is necessary because the pull rolls have very sensitive silicone exteriors. If these silicone exteriors become damaged, which can easily happen during the mounting of the pull rolls, the entire pull roll must be removed and repaired or replaced before it can be used.

Also, based on the complicated assemblies needed to mount the pull rolls to the machines, the laminating machines include highly complex mechanisms for adjusting the positions of the pull rolls with respect to one another. These mechanisms allow the space between the rolls to be widened or lessened to accommodate varying operating conditions, but, due to their complexity, often are difficult to assemble and repair when broken.

While laminating machines incorporating slots for supporting material supply rolls and slip clutch devices for controlling the movement of the material through the machine, these aspects of the laminating machine are not without certain drawbacks. For example, the replacement of the supply rolls in a laminating machine utilizing the slots to hold the supply roll presents a number of difficulties in the replacement process. First, the first supply rolls are very heavy. Therefore, the initial positioning of the supply roll in alignment with the slots requires a significant amount of effort on the part of the individual or individuals replacing the supply roll to lift the fresh supply roll into position. Furthermore, the slots do not include any means for adjusting the tension of the material coming from the supply roll in order to reduce any problems caused by an improper tensioning of the material being supplied to the laminating machine.

Also, while the use of a slip clutch provides an effective means for adjusting the tension of a laminating material moving through a laminating machine, there are problems with the configuration of the slip clutch as it is used in prior art laminating machines. More specifically, due to the fact that the slip clutch is attached to a driven gear which, in turn, is attached to a pulley engaged with a drive motor, the slip clutch and drive gear must be mounted coaxially on the laminating machine frame outwardly from the driven roller. This configuration results in a significant increase in the overall width of the machine. Further, in order for the power generated by the motor to be transferred from the slip clutch to other drive rollers, a second drive gear must also usually be positioned coaxially with respect to the first drive gear and the slip clutch. This results in a laminating machine configuration in which a plurality of drive belts must be connected between various rollers to transfer the power from the drive motor. Because the belts cannot overlap one another without impairing the transfer of the rotational power between the respective rollers, the belts must be laterally staggered outwardly away from the side of the laminating machine. This further increases the overall width of the laminating machine and the complexity of the drive system necessary to run the machine.

Therefore, it is desirable to develop a laminating machine which includes a supply roll mounting mechanism that reduces the amount of effort required to load a fresh supply roll onto the laminating machine and that also includes a tensioning means for adjusting the tension of the material supplied from the supply roll. It is also desirable to develop a laminating machine that includes an improved slip clutch mechanism that effectively transfers power between the drive motor and the various rollers on the machine and that reduces the complexity and width of the drive mechanism. It is still further desirable to develop a machine with a pull roll mounting assembly that has a construction that allows the pull rolls to be mounted easily to the machine without being damaged, and allows a more simple roll height adjustment mechanism to be used.

SUMMARY OF THE INVENTION

It is an object of the present invention to provide a laminating machine that includes a slip clutch assembly that minimizes the necessary offsets and idlers required for power transfer from the drive motor of the laminating machine.

It is another object of the invention to provide a slip clutch assembly that can be mounted directly to a driven roller to eliminate the need for any external mounting for the slip clutch and reduce the overall width of the machine.

It is a further object of the invention to provide a laminating machine including a mounting assembly for pull rolls that greatly increases the ease of mounting the rolls while also lessening the likelihood of damaging the rolls while being mounted.

It is another object of the invention to provide a laminating machine incorporating an improved roll mounting assembly that allows for a simplified roll height adjustment assembly.

It is still another object of the invention to provide a laminating machine that includes a supply roll mounting mechanism that greatly increases the ease in which a fresh laminating material supply roll can be positioned on the laminating machine.

It is still a further object of the invention to provide a laminating machine that includes a tensioning mechanism on the supply roll mounting mechanism in order to adjust the tension of the material supplied from the supply roll.

It is still another object of the present invention to provide a laminating machine having the above features that greatly reduces the overall complexity and cost of the laminating machine.

The present invention is a laminating machine including an improved slip clutch assembly for a driven roller and an improved supply roll mounting mechanism. Both the slip clutch and mounting mechanism enable the laminating machine to be tensioned at separate locations within the machine in order that the laminating material utilized in the machine is properly tensioned throughout its travel through the machine.

The improved slip clutch assembly includes a central shaft mounted directly within the hub of the driven roller. By mounting the slip clutch assembly directly to the driven roller, the assembly can be aligned with the drive motor and drive pulley in order to eliminate many of the idler pulleys and belts previously required to transfer power from the driven pulley to the slip clutch assemblies and driven rollers. This greatly reduces the complexity of the drive mechanism for the machine and significantly reduces the overall width of the machine.

The supply roll mounting mechanism includes a slip clutch tensioning mechanism disposed within the mechanism and utilized to adjust the tension of the laminating material supplied from the supply roll to the machine. This enables an operator of the machine to continuously adjust the tension of the laminating material supplied from the roll to accommodate changes in the operation of the laminating machine.

Furthermore, the mounting mechanism includes a support roll holder pivotally mounted at one end to the laminating machine. Opposite the pivoting connection, the support roll holder is releasably engageable with a latching mechanism integrated with the frame of the laminating machine that is operable to hold the support roll holder in a stationary position when material is supplied from the support roll. When all of the laminating material has been removed from the supply roll, the latching mechanism can be disengaged from the supply roll holder in order to allow the roll holder to pivot outwardly from the laminating machine. When the support roll holder is pivoted away from the laminating machine, the exhausted supply roll can be removed and replaced with a fresh supply roll in a quick and easy manner that greatly reduces the downtime for the laminating machine.

Various other features, objects and advantages of the invention will be made apparent from the-following detailed description taken together with the drawings.

BRIEF DESCRIPTION OF THE DRAWINGS

The drawings illustrate the best mode presently contemplated of carrying out the invention.

In the drawings:

FIG. 3b is a partial exploded view of the supply roll tensioning and pivoting assembly used in the machine of FIG. 1;

DETAILED DESCRIPTION OF THE INVENTION

Figure 1:
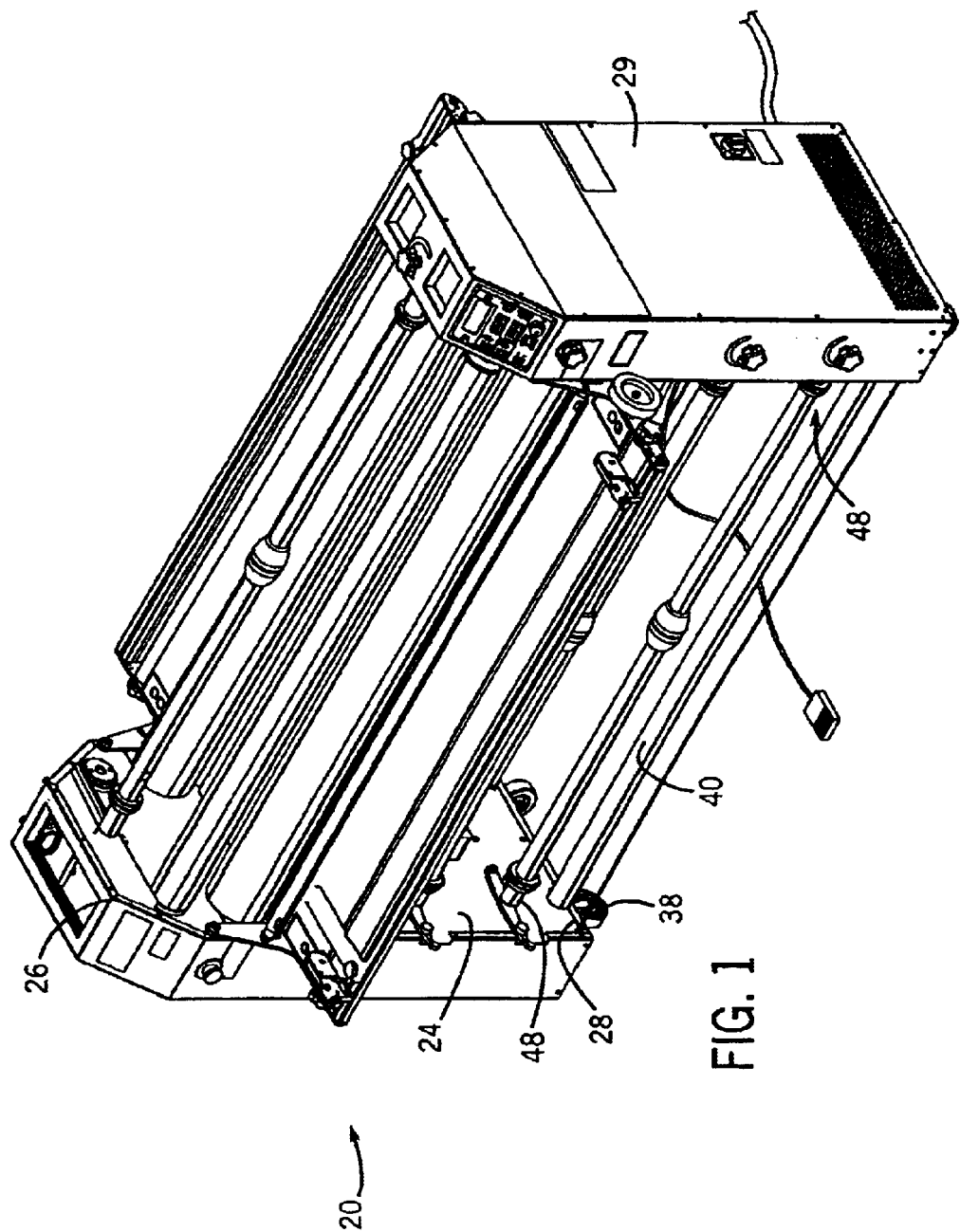
FIG. 1 is a front isometric view of a laminating machine constructed according to the present invention.
Figure 2:
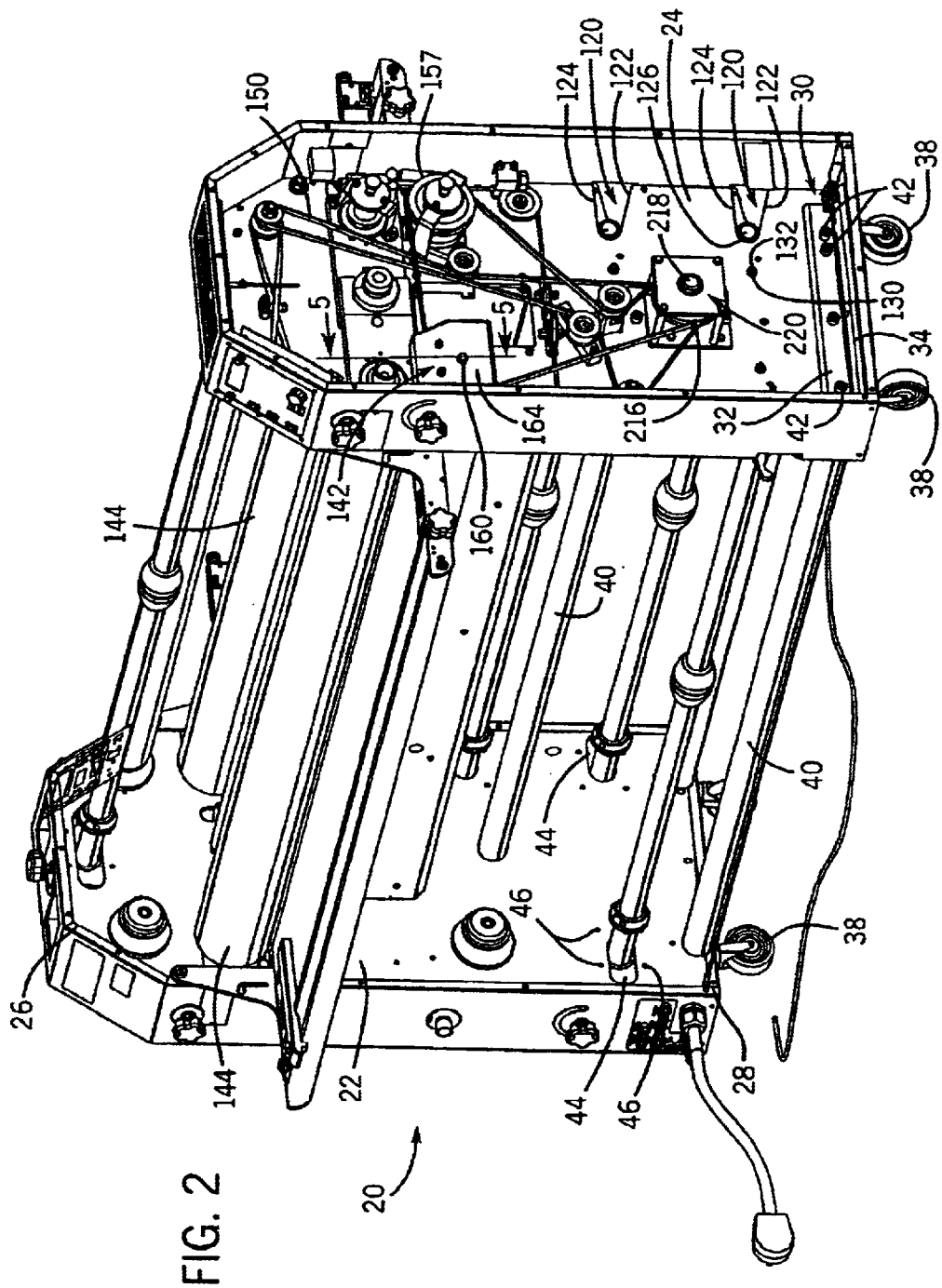
FIG. 2 is a rear isometric view of the laminating machine of FIG. 1.

With reference now to the drawing figures in which like references numerals designate like parts throughout the disclosure, a laminating machine is indicated generally at 20 in FIGS. 1 and 2. The laminating machine 20 includes a pair of upstanding frame members 22 and 24 that each have an upper end 26 and a lower end 28. The frame members 22 and 24 are formed of a generally rigid material, such as metal, with steel being the preferred metal, and are enclosed by removable covers 29. At the lower end 28, each frame member 22 and 24 includes a flange 30 secured to one side of the frame member 22. The flange 30 is generally L-shaped and includes an upwardly extending portion 32 secured to the frame member 22 and an outwardly extending portion 34 that extends outwardly perpendicular to the frame member 22. The outwardly extending portion 34 includes a number of openings (not shown) used to connect a number of casters 38 to the flange 30. Casters 38 enable the laminating machine 20 to be moved over a generally smooth surface in order to position the laminating machine 20 where desired.

The frame members 22 are interconnected adjacent the lower end 28 by a pair of rigid braces 40. The braces 40 are generally cylindrical in shape and are connected to each frame member 22 and to the upwardly extending portions 32 of the flanges 30 on each frame member 22. The braces 40 and flanges 30 are secured to the frame members 22 by a number of fasteners 42 extending through the members 22. The laminating machine 20 may also include a second pair of braces 40 extending between the upper ends 26 of each frame member 22 and connected by fasteners 42 in order to enhance the stability of the laminating machine 20.

The right frame member 22 also includes a pair of elongate apertures 44 spaced from the lower end 28 of the frame member 22. The apertures 44 extend in a generally horizontal direction and are surrounded by a number of aligned bores 46 which are utilized to mount an unwind supply roll pivot and tensioning assembly 48 shown in FIGS. 3a and 3b.

Figure 3A:
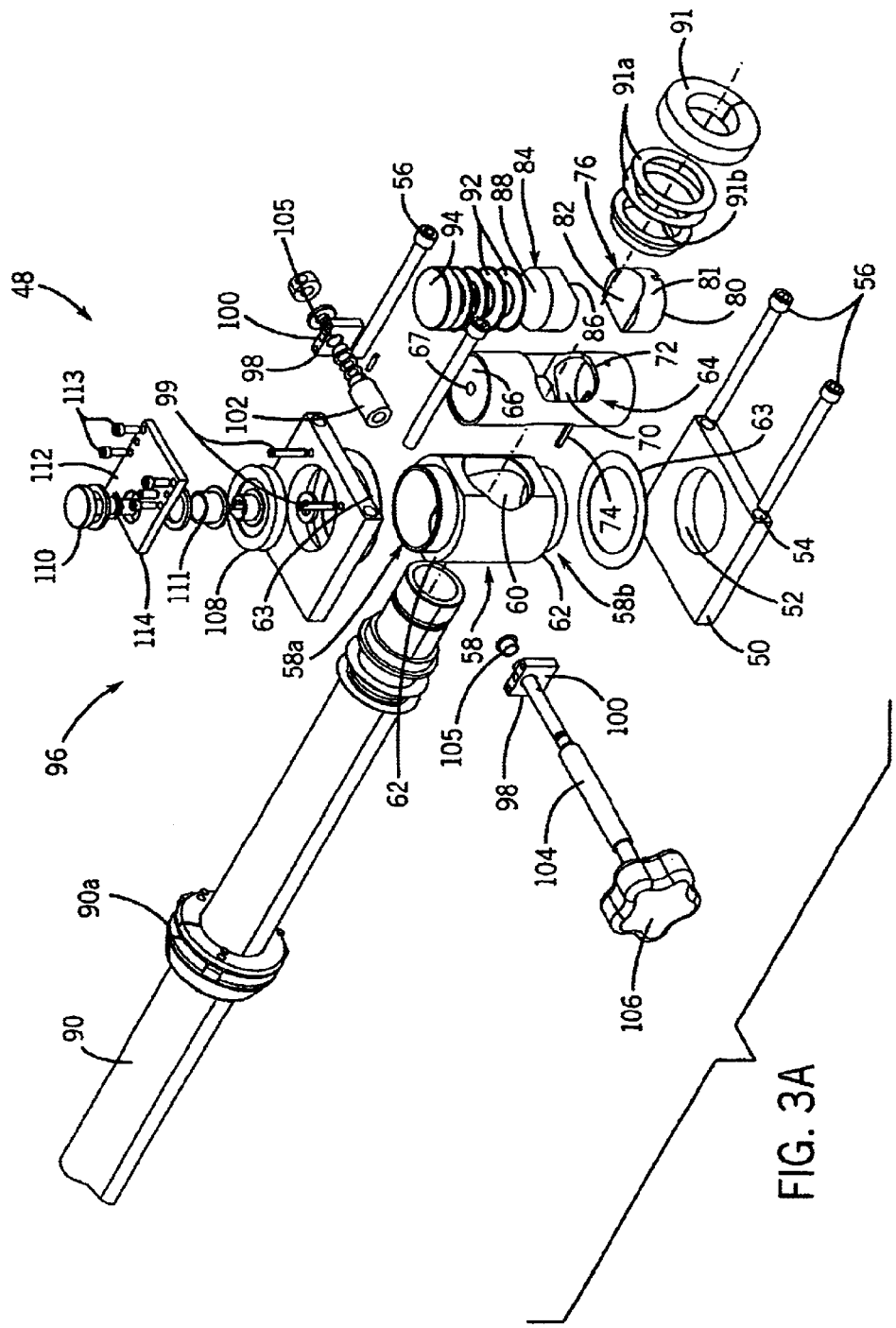
FIG. 3a is a partial exploded view of a supply roll tensioning and pivoting assembly used in the machine of FIG. 1.

Referring now to FIG. 3a, the pivot and tensioning assembly 48 includes a pair of support blocks 50 that each include a central opening 52 extending through the blocks 50 and a pair of fastener openings 54 extending through each side of the block 50 perpendicular to the central opening 52. A pair of elongate screws 56 are inserted through the fastener openings 54 and into the bores 46 in order to attach each of the support blocks 50 perpendicularly to the frame member 22 on opposite sides of one of the elongate aperture 44.

The support blocks 50 enclose and retain an unwind pivot 58 therebetween. The unwind pivot 58 is preferably cylindrical in shape, but can also be generally rectangular or hexagonal, and includes an open upper end 58a, a closed lower end 58b, and a central through bore 60 extending through the pivot 58 perpendicular to the longitudinal axis of the pivot 58. The pivot 58 also includes a pair of recessed end collars 62 disposed at the top and bottom ends of the pivot 58 that are insertable into the central openings 52 in each of the support blocks 50 to engage low-friction washers 63 and rotatably secure the unwind pivot 58 between the support blocks 50. This allows the unwind pivot 58 and a supply roller 90 including a number of roll supports 90a connected to the pivot 58 to be rotated with respect to the frame member 22, moving the roller 90 between a use position and a loading position. In the loading position, an empty supply roll can be slid off of the supply roller 90 and replaced with a fresh supply roll. The roller 90 can then be pivoted back into the use position where the fresh supply roll can be engaged with the machine 20 to supply laminating material to the laminating machine 20.

The tensioning assembly 48 also includes a braking cylinder 64 having a closed top end 66 including an opening 67 and a closed bottom end 68. The cylinder 64 is inserted into the open upper end 58a of the unwind pivot 58 through the central opening 52 in the upper support block 50. The cylinder 64 includes a central aperture 70 extending through the cylinder 64 that is alignable with the through bore 60 in the unwind pivot 58. The aperture 70 includes a pair of aligned slots 72 at the lower end of the aperture 70 that receive and retain a spring pin 74 that extends across the center of the cylinder 64. A lower brake pad 76 is also disposed within the cylinder 64. The brake pad 76 is generally cylindrical in shape and includes a flat bottom surface 80 having a notch 81 alignable with the slot 72 and capable of receiving the spring pin 74 and a curved upper surface 82. An upper brake pad 84 is also positioned within the cylinder 64 above the lower brake pad 76. The upper brake pad 84 is formed similarly to the lower brake pad 76 but is inverted within the cylinder 64 with respect to the lower brake pad 76 such that the upper brake pad 84 includes a lower curved surface 86 and an upper flat surface 88. Both the lower brake pad 76 and upper brake pad 84 are slidably received within the cylinder 64 so that one end of the unwind supply roller 90 can be inserted through the bore 60 and aperture 70 in the pivot 58 and cylinder 64, respectively, and between the brake pads 76 and 84. The end of the roller 90 that is inserted through the pivot and tensioning assembly 48 is rotatably retained therein by a locking collar 91, thrust washers 91a and rotatable bearing 91b engaged with the roller 90 and assembly 48 opposite the frame member 22.

Within the cylinder 64, a number of spring discs 92 are disposed above the upper brake pad 84 which are used to urge the upper brake pad 84 downwardly into engagement with the supply roller 90 to control the rotation of the roller 90 in conjunction with the lower brake pad 78. A plunger 94 is also disposed within the cylinder 64 in engagement with the spring discs 92 opposite the upper brake pad 84. The plunger 94 is engaged by an adjustment mechanism 96 to selectively press downwardly on the spring discs 92 and upper brake pad 84 to control the rotation of the roller 90.

The adjustment mechanism 96 is disposed on the upper support block 50 and operatively engaged with the upper brake pad 84. The mechanism 96 includes a pair of vertical support walls 98 mounted to the top of upper support block 50 on opposite sides of the central opening 52 by pins 99. The walls 98 each include a central opening 100 and receive and retain a worm 102 therebetween. The worm 102 is generally cylindrical in shape and is positioned on a crankshaft 104 that extends through the worm 102 and is rotatably supported by bearings 105 disposed in the openings 100 of each of the support walls 98. Opposite the worm 102, the crankshaft 104 is engaged with a handle 106 that enables the crankshaft 104 to be manually rotated to adjust the position of the worm 102.

The worm 102 is engaged with a worm gear 108 disposed above the central opening 52 in the upper support block 50. The worm gear 108 is supported by a worm gear shaft 110 rotatably mounted to a bearing 111 positioned within a support plate 112. Support plate 112 is mounted between the upper ends of each support wall 98 by fasteners 113 and extends inwardly over the central opening 52 of the support block 50. The plate 112 includes a central bore 114 through which the worm gear shaft 110 extends. The worm gear shaft 110 is keyed to fit within the worm gear 108 and includes a threaded end (not shown) that passes through the worm gear 108 and threadably engages the opening 67 in the top end 66 of the cylinder 64 and extends therethrough into engagement with the plunger 94 and upper brake pad 84. Thus, when the crankshaft 104 is rotated, the worm gear 102 engages and rotates the worm gear 108 to consequently raise or lower the worm gear shaft 110 due to the engagement of the threaded end of the shaft 110 with opening 67. By raising the worm gear shaft 110, the upper brake pad 84 disengages from the roller 90 to lessen any braking effect of the brake pads 76 and 84 on the roller 90. This consequently reduces the tension applied to the laminating material by the roller 90. Conversely, when the worm gear shaft 110 is moved downwardly, the upper brake pad 84 is urged against the supply roller 90 to enable the brake pads 76 and 84 to perform a braking action on the rotation of the roller 90 thereby increasing the tension on the material.

Referring to FIGS. 2 and 3b, in order to allow the supply roller 90 to be selectively pivoted between the use and loading positions and to retain the roller 90 in the use position while the laminating machine 20 is in operation, the laminating machine 20 also includes a latching mechanism 115 disposed on the left frame member 24 opposite the tensioning assembly 48. The latching mechanism 115 includes a slot 120 extending inwardly from one side of the frame member 24 and located generally in alignment with the elongate aperture 44 in the frame member 22. The slot 120 includes a lower, downwardly sloping surface 122 and an upper, generally flat surface 124 joined by a curved inner end 126. The downwardly sloping surface 122 is generally straight but may also include a depression (not shown) disposed in alignment with the elongate aperture 44.

A pivot opening 130 is spaced inwardly from the curved end 126 of the slot 120. The opening 130 receives a fastener 132 which also extends through an aligned opening in a roller latch 134. The latch 134 is pivotally secured to the frame member 24 by the fastener 132 and a bearing 135 such that the latch 134 may rotate with respect to the slot 120. The latch 134 includes a handle portion 136 including a handle 137 disposed opposite the fastener 132 and a recess 138 disposed between the handle portion 136 and fastener 132 that is arcuately shaped.

When the roller 90 is pivoted into the use position, the end of the roller 90 opposite the unwind pivot 58 slides upwardly into the slot 120 along the downwardly sloping surface 122. The roller 90 slides upwardly along the surface 122 until reaching the inner end 126. Because the end 126 places the roller 90 in alignment with the recess 138 on the latch 134, once the roller 90 is positioned against the inner end 126, the latch 134 can be pivoted downwardly to place the recess 138 around the roller 90. In this position, the roller 90 is not restricted from rotation by the engagement of the roller 90 between the inner end 126 and recess 138 due to the presence of a bearing 140 positioned on the end of the roller 90 and retained thereon by a locking ring 141. When the roller 90 is engaged by the latch 134, the recess 138 and slot 120 engage the bearing 140 and allow the roller 90 to freely rotate with respect to the bearing 140 while the machine 20 is in use.

Figure 4:
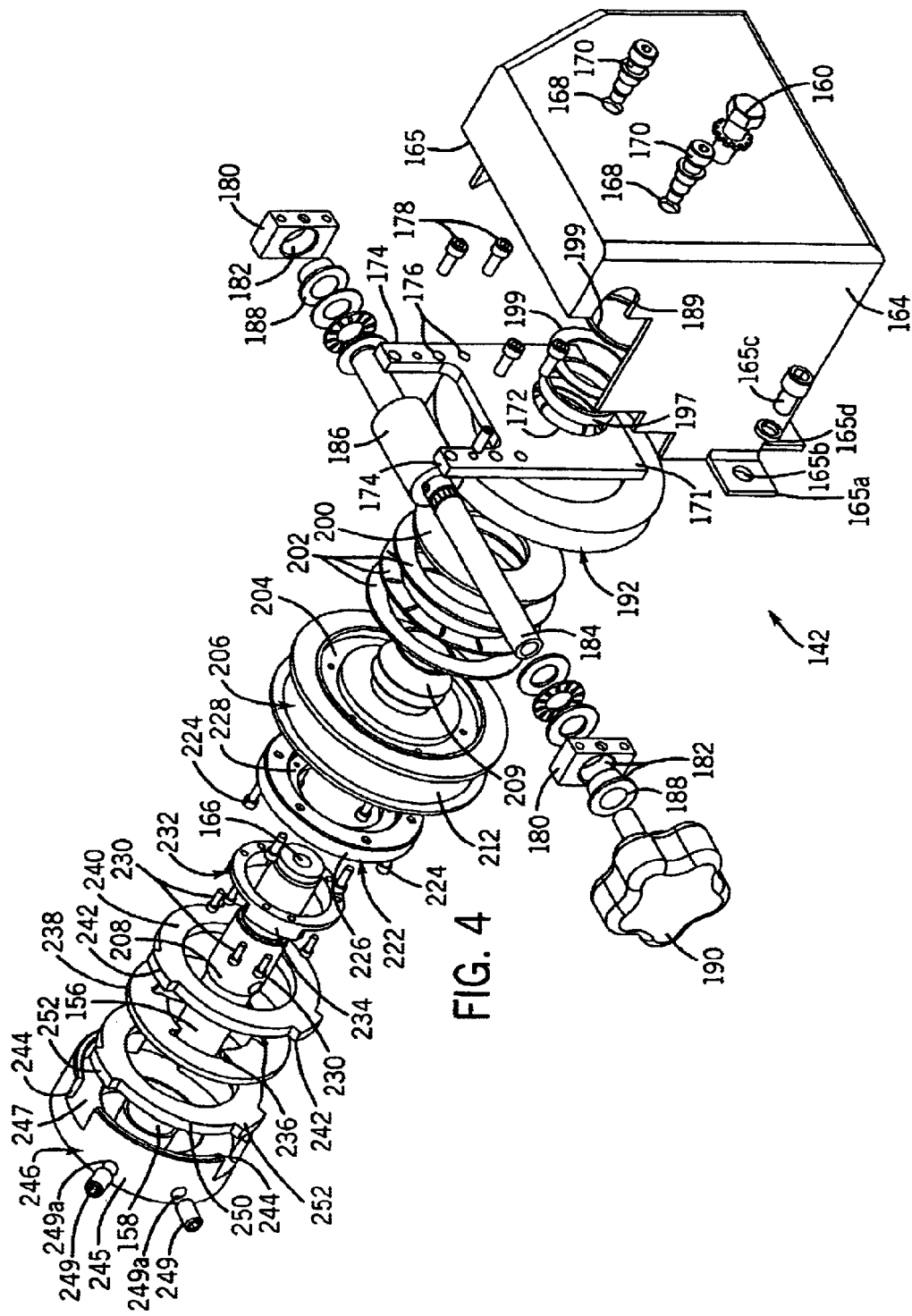
FIG. 4 is an exploded view of a slip clutch mechanism utilized with the machine of FIG. 1.
Figure 5:
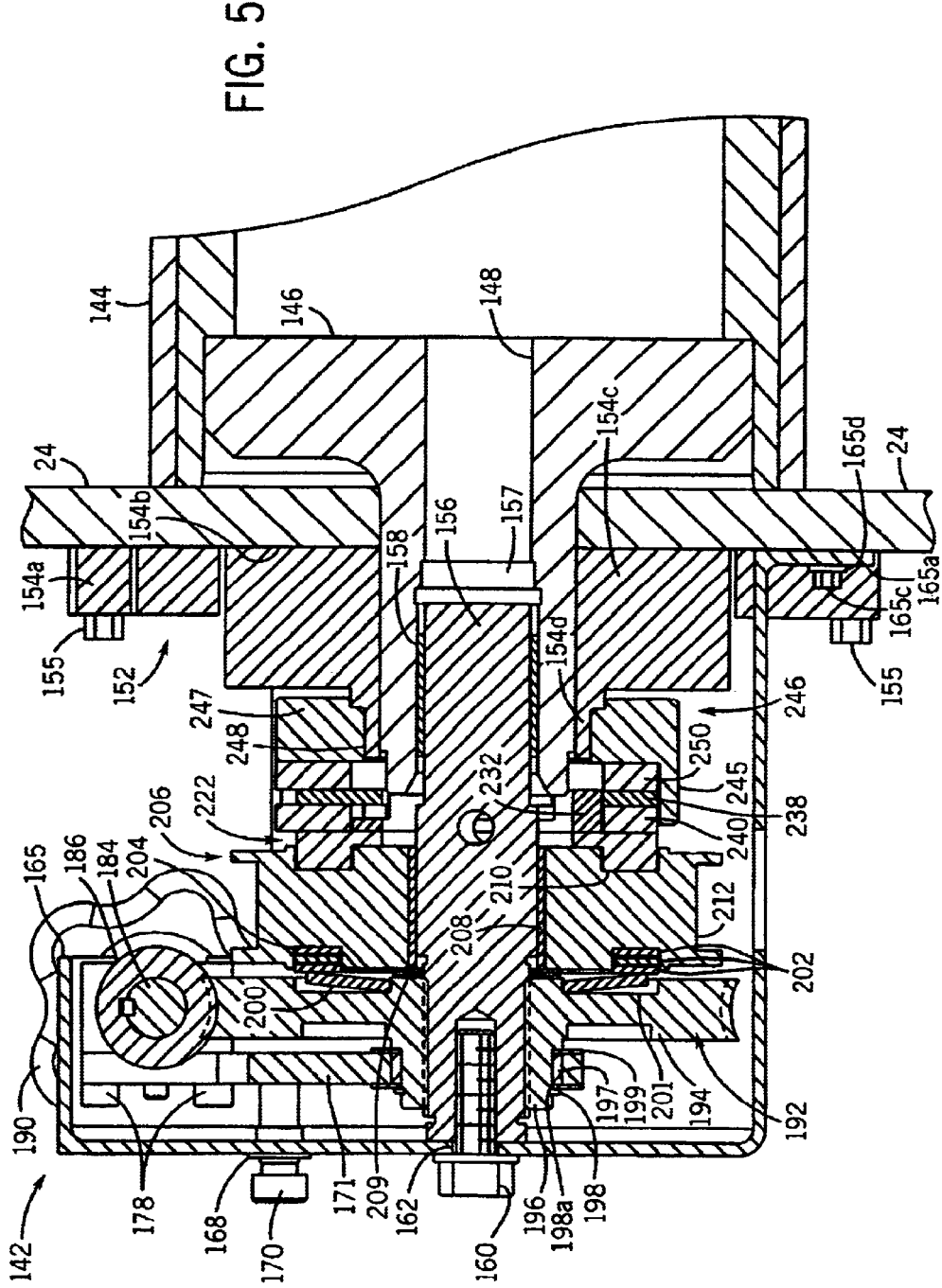
FIG. 5 is a cross-sectional view along line 5—5 of FIG. 2.

Referring now to FIGS. 2 and 4–5, a slip clutch mechanism 142 is illustrated attached to the frame member 24 of the laminating machine 20. The slip clutch mechanism 142 is mounted to one end of a pull roll 144 that extends between and is rotatably supported by the frame members 22 and 24 of the laminating machine 20. The pull roll 144 is generally cylindrical in shape and includes an outwardly extending hub 146 at each end. The hub 146 is fixed at one end to the interior of the pull roll 144 and includes a longitudinal through bore 148. Each hub 146 extends through and is rotatably supported by the frame members 22 and 24 such that the pull roll 144 is rotatable with respect to the frame members 22 and 24. Preferably, each hub 146 is inserted through aligned openings 149 in the members 22 and 24 that allow the hub 146 and pull roll 144 to rotate freely with respect to the frame members 22 and 24.

A bearing 152 is fixed to the exterior of the hub 146 and the frame member 24 and opposite the pull roll 144. The bearing 152 includes an outer housing 154a and an inner rotatable sleeve 154b. The outer housing 154a is fixed to the frame member 24 by a number of bolts 155 inserted through bores (not shown) in the outer housing 154a. The inner sleeve 154b is fixed to the hub 146 and includes a main portion 154c positioned within the outer housing 154a and an outwardly extending collar 154d integrally formed with the main portion 154c that forms a central passage 154e extending through the sleeve 154b.

The slip clutch mechanism 142 is mounted to the hub 146 by a clutch shaft 156 inserted within the through bore 148. Shaft 156 can be mounted within and rotatable with respect to the hub 146 in any conventional manner, such as by inserting the shaft 156 in the hub 146 to contact an end cap 157 disposed within the hub 146 and using at least one bearing 158 positioned between the shaft 156 and hub 146 that allows the hub 146 to rotate around the shaft 156. The bearing 158 can be a sleeve bearing, as is shown, or a cage containing a number of pin bearings or ball bearings.

The shaft 156 extends outwardly from the hub 146 and is fixedly supported opposite the hub 146 by a bolt 160 inserted through a lock washer 161 and a central opening 162 in a slip clutch housing 164. The bolt 160 is threadably received within a bore 166 in the shaft 156 located opposite the hub 146 to maintain the shaft 156 stationary with respect to the housing 164. The housing 164 is formed of a rigid material and is generally rectangular in shape with an open end 165 that is positioned adjacent the exterior of the frame member 24 around the bearing 152 using a tab 165a extending from the housing 164. The housing 164 can also alternatively be formed from a rigid plate (not shown) formed of a generally rigid material, such as sheet metal that is attached to the frame member 24 to enclose the slip clutch mechanism 142 by a number of bolts (not shown) and spacers (not shown) positioned around the mechanism 142. The tab 165a includes an opening 165b that receives a fastener 165c and washer 165d in order to secure the housing 164 to the frame member 24 and to generally enclose each of the moving parts of the slip clutch mechanism 142. The housing 164 also includes a pair of spaced openings 168 that receive fasteners 170 to support a clutch plate 171 within the housing 164. The clutch plate 171 includes a central opening 172 adjacent one end through which the clutch shaft 156 extends and a pair of upwardly extending tabs 174 at the opposite end. The tabs 174 each include a plurality of openings 176 that receive screws 178 which secure a pair of clutch braces 180 to each tab 174 opposite the housing 164. The braces 180 each include a central opening 182 through which a crankshaft 184 extends in a direction perpendicular to the clutch shaft 156. Crankshaft 184 supports a worm 186 between the braces 180 and is rotatably mounted within the braces 180 by a pair of flanged bearings 188 disposed in each central opening 182. At one end, the crankshaft 184 extends outwardly from the housing 164 through a recess 189 and is connected to a handle 190 that is used to manually rotate the crankshaft 184 and worm 186. Alternatively, the crankshaft 184 can be connected to a mechanical controller (not shown) that automatically controls the rotation of the crankshaft 184.

The slip clutch mechanism 142 further includes a worm gear 192 disposed about the clutch shaft 156 directly beneath the worm 186. The worm gear 192 includes an axially outwardly extending central hub 194 engaged with the worm 186 that defines a central sleeve 196 through the worm gear 192. The sleeve 196 is positioned within the central opening 172 in the clutch plate 170 and is rotatably retained therein by a bearing 197, a snap ring 198 inserted within a groove 198a in the sleeve 196, and a pair of washers 199 disposed around opposite sides of the opening 172 that are engaged with the sleeve 196. The clutch shaft 156 extends through the sleeve 196 and is threadably engaged with the sleeve 196 such that the worm gear 192 is maintained stationary with respect to the shaft 156. However, by rotating the crankshaft 184 and worm 186, the gear 192 can be rotated around the shaft 156 to move the gear 192 laterally along the shaft 156 towards or away from the roll 144 due to the threaded engagement between the sleeve 196 and the shaft 156.

Opposite the clutch plate 171, the worm gear 192 engages a spring disc 200 disposed within a circular recess 201 in the gear 192 located opposite the sleeve 196. The spring disc 200 is formed of a generally resilient material, such as a thin ring of a metal, thermoplastic or thermosetting material and projects outwardly away from the gear 192 to resiliently contact a plurality of thrust washers 202 which are retained within a first circular recess 204 in one side of a circular timing pulley 206. A sprocket (not shown) can also be used as an alternative for the pulley 206. Pulley 206 is rotatably mounted to the clutch shaft 156 adjacent the worm gear 192 by a bearing 208. The bearing 208 can be any suitable type of bearing, such as those described regarding bearing 158, but preferably is a cylindrical sleeve bearing that allows the pulley 206 to rotate independently of the clutch shaft 156. The pulley 206 also includes a pair of spacers 209 used to prevent the worm gear 192 from directly contacting the pulley 206.

The pulley 206 also includes a second circular recess 210 opposite the circular recess 204 in which the thrust washers 202 are disposed and a peripheral or circumferential groove 212 extending completely around the pulley 206. The groove 212 is shown as being flat, but may also be toothed or V-shaped. The groove 212 receives a belt 150 that is connected to a drive pulley 216 fixed to a rotatable output shaft 218 of a motor 220. The belt 150 can be a flat belt, grooved belt, or V-shaped belt that conforms to the configuration of the pulley 206 and groove 212, and is formed from any conventional belt material such as rubber, reinforced rubber, flexible composite materials, or any other suitable material. Further, if a sprocket is used in place of the pulley 206, a chain (not shown) capable of engaging the sprocket can be substituted for the belt 150. When the motor 220 is activated, the motor 220 rotates the output shaft 218 and drive pulley 216 in order to move the belt 150. The movement of the belt 150 consequently causes the timing pulley 206 to rotate about the shaft 156. The belt 150 also extends from the pulley 206 to a second pulley (not shown) in order to rotate a second roll 144 before returning to the drive pulley 216. Thus, the mechanism 142 eliminates the need for more than one belt 150 to transfer power between the motor 220 and a number of rolls 144.

Referring now to FIGS. 4 and 5, a clutch friction driver disc 222 is fixedly mounted within the second recess 210 of the timing pulley 206 by a number of fasteners 224 secured between the driver disc 222 and pulley 206. The driver disc 222 is preferably formed of a rigid, high friction material such as a metal, preferably steel, and most preferably 1020 steel, 1045 steel, 4140 steel or graycast steel. The driver disc 222 includes an outer ring portion 226 mounted by the fasteners 224 within the second recess 210, and an inner ring portion 228 extending inwardly from the outer ring portion 226. The inner ring portion 228 is fixed by a number of fasteners 230 opposite the pulley 206 to a driven disc 232 formed of a material similar to the drive disc 222. Both the driver disc 222 and driven disc 232 have an inner diameter large enough to be disposed around and spaced from the clutch shaft 156 so that they may rotate with the pulley 206 independently of the clutch shaft 156.

The driven disc 232 includes a number of projections 234 extending axially outwardly from the periphery of the driven disc 232 opposite the driver disc 222. The projections 234 are received within arcuate slots 236 located on an inner circumference of a floating clutch disc 238. The floating clutch disc 238 is formed of a rigid high friction material similar to the drive disc 222 and the driven disc 232, and is spaced from the driver disc 222 by a first friction disc pad 240. The first friction disc pad 240 is formed of a high friction material, such as a graphitic mixture or a rigid thermoplastic material, with a homopolymer acetal being the most preferred material. The first disc pad 240 has an inner diameter larger than the outer diameter of the driven disc 232 such that the first friction disc pad 240 completely encircles the driven disc 232 and allows the driven disc 232 to engage and rotate the floating disc 238 without engaging the first disc pad 240. The first disc pad 240 also includes a number of arcuate circumferential projections 242 that are received within notches 244 located in an exterior wall 245 of a generally cylindrical disc housing 246.

The housing 246 also includes a circular bottom ring 247 attached along its periphery to the exterior wall 245 and including a central opening 248. The hub 146, collar 154d, and clutch shaft 156 extend through the central opening 248 so that the housing 246 encircles the shaft 156 and is fixedly mounted to the collar 154d of the bearing 152 to rotate with the hub 146 and collar 154d. The housing 246 can be mounted to the collar 154d by force fitting the ring 247 around the collar 154d, but is preferably mounted using set screws 249 extending through openings 249a in the ring 247 and engaging depressions (not shown) in the exterior of the collar 154d. The housing 246 also encloses a second friction disc pad 250 having projections 252 that is formed identically to and of the same material as the first friction disc pad 240 and is positioned in engagement with the housing 246 between the ring 247 of the housing 246 and the floating disc 238.

In operation, when the motor 220 is engaged, the timing pulley 206 is driven by the belt 150 connected between the timing pulley 206 and drive pulley 216. The timing pulley 206 consequently rotates about the clutch shaft 156 without rotating the clutch shaft 156 due to the presence of the bearing 208 between the shaft 156 and pulley 206. The driver disc 222 and floating disc 238 which are operably connected to the pulley 206 also rotate with the pulley 206. To selectively engage the timing pulley 206 with the hub 146 and pull roll 144 to rotate the pull roll 144, the handle 190 on the crankshaft 184 is turned to rotate the worm 186 in order to engage and laterally adjust the position of the worm gear 192 on the shaft 156 towards the pulley 206. By laterally adjusting the position of the worm gear 192, the worm gear 192 presses the spring disc 200 into engagement with the thrust washers 202 disposed on the timing pulley 206. This, in turn, urges the pulley 206 and the driver disc 222 toward the roll 144, such that the first disc pad 240 and second disc pad 250 are urged into frictional engagement with the floating clutch disc 238, causing the first disc pads 240 and 250 to rotate. The rotation of the disc pads 240 and 250 consequently causes the housing 246 to rotate due to the engagement of the projections 242 and 252 on the discs 240 and 250 within the notches 244. As the housing 246 begins to rotate, because the housing 246 is fixedly connected to the inner sleeve 154b, hub 146 and roll 144, these also begin to rotate. However, the weight of the roll 144 causes the disc pad 240 and 250 to slip with respect to the floating clutch disc 238, such that the roll 144 rotates more slowly than the clutch disc 238 and pulley 206. By increasing the engagement of the spring disc 200 with the timing pulley 206 but further adjusting the position of the gear 192 towards the pulley 206, the first friction disc pad 240 and the second friction disc 250 are further compressed into engagement with the rotating floating disc 238. The increasing engagement of the friction disc pads 240 and 250 with the floating clutch disc 238 reduces the slippage of the pads 240 and 250 on the floating disc 238, consequently increasing the rotational speed of the pads 240 and 250, the housing 246, the inner sleeve 154b and the hub 146 to rotate the roll 144 at increasing rotational speeds until the speed of the roll 144 is equal to that of the shaft 156.

Alternatively, by moving the worm gear 192 away from the pulley 206 and reducing the engagement of the spring disc 200 with the timing pulley 206, the frictional engagement between the driven disc 222, floating disc 238 and first and second friction disc pads 240 and 250 lessens, allowing the disc pads 240 and 250, and roll 144, to slip with respect to the rotation of the floating disc 238 and the timing pulley 206. In this manner, the rotational speed of the roll 144 can be adjusted to compensate for differing conditions which occur during the operation of the laminating machine 20.

The various structural components of the laminating machine discussed above are formed of a generally rigid material in order that the components do not become deformed during use. The rigid material used can be a metal or a hard plastic, with a homopolymer acetal being preferred. Furthermore, the slip clutch mechanism 142 can be directly driven by engaging the motor 220 directly with the clutch shaft 156. Also, the number of friction disc pads and floating discs located within the housing 246 can be increased to provide a greater range of rotational speeds that can be achieved for the roll due to the greater number of frictional interactions between the pads and the floating devices.

Figure 7:
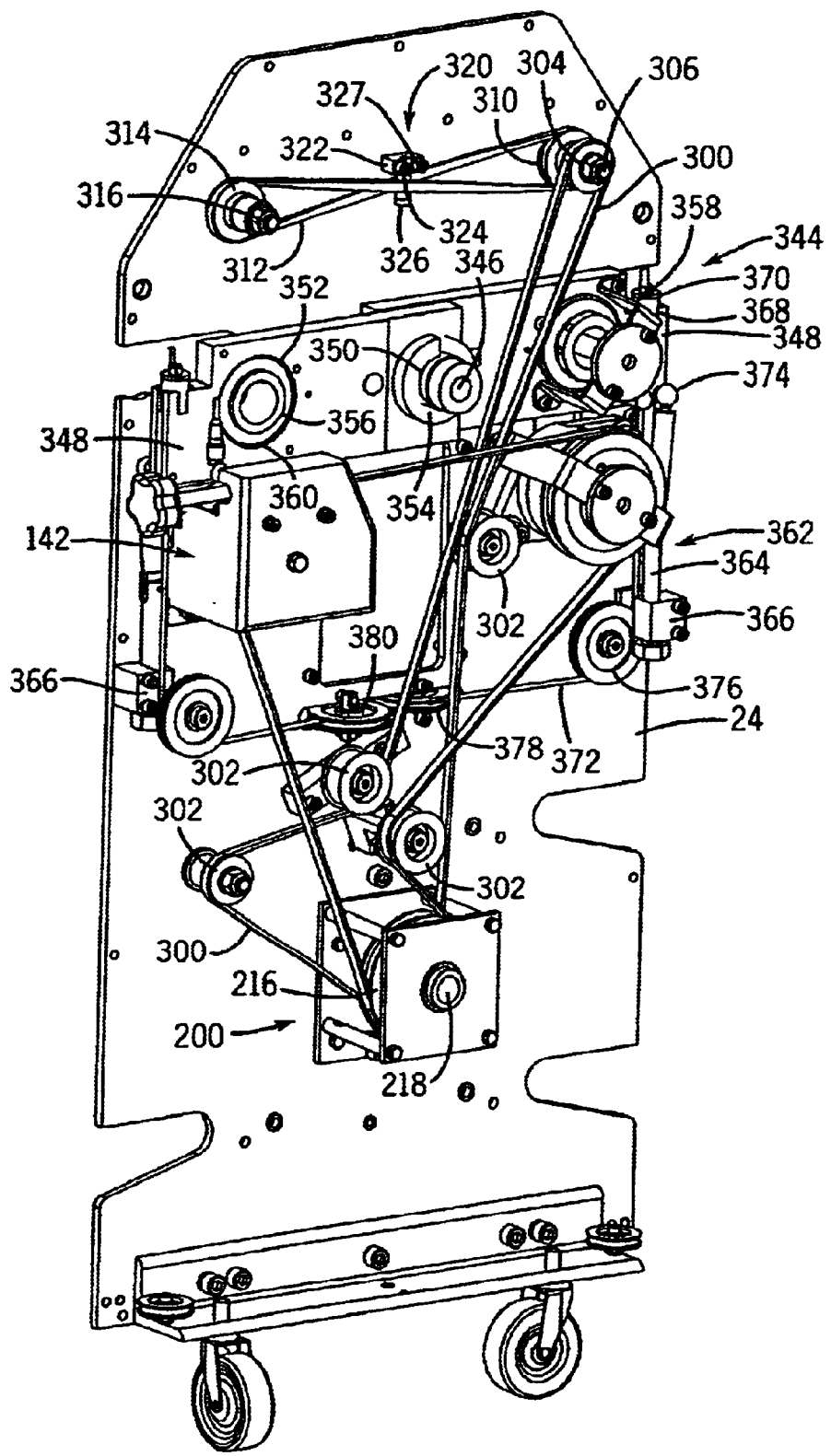
FIG. 7 is an isometric view of the assembled frame member of FIG. 6.

Referring now to FIG. 7, the side frame 24 of the laminating machine 20 is shown including the slip clutch mechanism 142. The motor 220 is illustrated as being connected to a second belt 300 that is mounted to the drive pulley 216 on the rotatable shaft 218 of the motor 220 adjacent the belt 150. The second belt 300 is directed by a number of freely rotating directional pulleys 302 to a driven pulley 304. The driven pulley 304 is mounted to a shaft 306 that is fixedly connected to a rewind roll 308 (shown in FIG. 1) rotatably positioned between the frame members 22 and 24. As the belt 300 rotates around the drive pulley 216, the belt 300 rotates the driven pulley 304 and shaft 306 to rotate the rewind roll 308.

The shaft 306 also includes a transfer pulley 310 fixedly connected to the shaft 306 outwardly from the driven pulley 304 on which is received a transfer belt 312. The belt 312 extends across the frame member 24 and is operably connected to a second transfer pulley 314. The second pulley 314 is fixedly attached to a second shaft 316 that is operably connected to a second rewind roll 318 (shown in FIG. 1) positioned parallel to but spaced from the first rewind roll 308. Because the first rewind roll 308 and second rewind roll 318 are to rotate in opposite directions with respect to one another when the machine 20 is operating, a belt inverter 320 is positioned between the transfer pulleys 310 and 314. The belt inverter 320 includes a block 322 fixedly mounted perpendicularly to the frame member 24 by a pair of fasteners 324 that extend through the block 322 into engagement with the frame member 24. Between the fasteners 324 is located an opening (not shown) that receives and retains one end of an inverting rod 326. The rod 326 can be another fastener 324 or other cylindrical metal rod that has a plastic bearing 327 disposed around the exterior of the rod 326. The rod 326 extends downwardly from the block 322 such that the bearing 327 contacts each portion of the belt 300 passing between the transfer pulleys 310 and 314. The rod 326 and bearing 327 invert the belt 300 such that the portion of the belt 300 coming from the top of the transfer pulley 310 is diverted to the bottom of the transfer pulley 314. Furthermore, the portion of the belt 300 moving from the top of the transfer pulley 314 is directed downwardly to the bottom end of the transfer pulley 310. In this manner, the rotation of the transfer pulleys 310 and 314 are made to be opposite one another, such that the associated rewind rolls 308 and 318, respectively, are made to rotate in directions opposite to one another.

Figure 6:
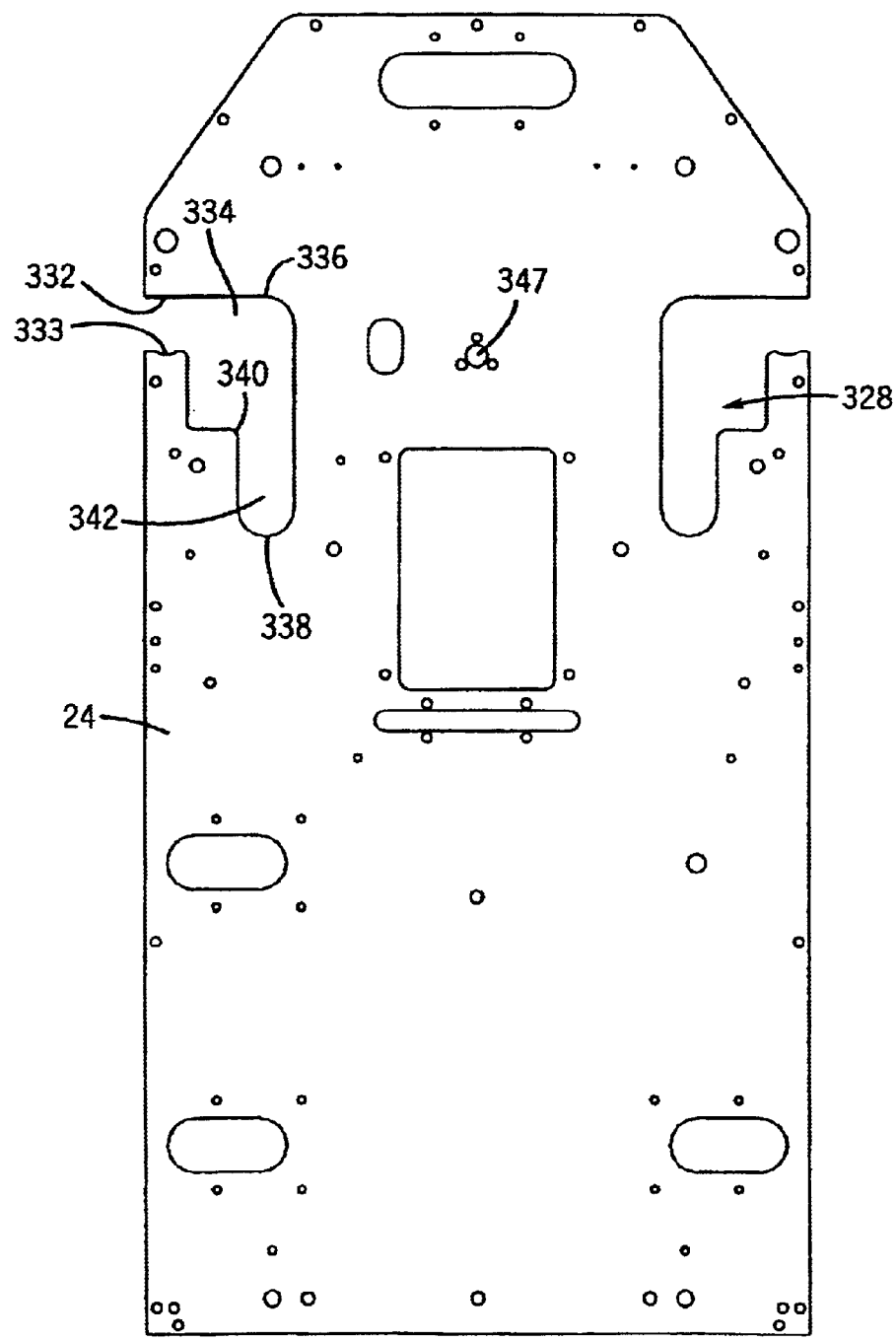
FIG. 6 is a front plan view of a frame member of the laminating machine of FIG. 1.

Looking now at FIGS. 6 and 7, the structure of the frame member 24 is shown with and without attachment of the tensioning assembly 48 and slip clutch mechanism 142. As best shown in FIG. 6, the structure of the frame member 24 illustrates a pair of channels 328 that form a part of a roll mounting and adjustment mechanism 330. The opposite frame member 22 is constructed identically to frame member 24. Each of the channels 328 is positioned adjacent the upper end 26 of the frame member 24, and extends downwardly and inwardly towards the center of the frame member 24. Each channel 328 includes a lateral opening 332 disposed in the side of the frame member 24 that defines a recess 333, and a downwardly extending slot 334 connected to the lateral opening 332. The slot 334 includes a top end 336 adjacent the lateral opening 332, and a bottom end 338 positioned opposite the opening 332. The slot 334 also includes an annular shoulder 340 extending inwardly from the side of the slot 334 adjacent the lateral opening 332. The shoulder 340 defines a restricted lower portion 342 of the slot 334 leading to the bottom end 338 in order to effectively retain a pull roll 44 within the slot 334.

To load the pair of rolls into the channel 328, the first pull roll 44 is positioned within the lateral opening 332 such that each hub 146 of the pull roll 44 is disposed within the recess 333 on the lateral opening 332. The pull roll 44 can then be lifted out of the recess 333 and lowered into the lower portion 342 of the slot 334 defined by the annular shoulder 340. The second pull roll 44 can then be disposed within the lateral opening 332 by placing the opposite hubs 146 in the recesses 333. The first pull roll 44 can then be mounted to the frame member 24 by attaching a mechanism such as the slip clutch mechanism 142 or other position retaining structure to the hub 146 of the pull roll 44. The second pull roll 44 can then be positioned above the first pull roll 44 by moving the second pull roll 44 out of the recesses 333 and lowering the second roll 44 onto the first roll 44. In this manner, both the first and second pull rolls 44 can be mounted to the frame members 22 and 24 without causing undue damage to the rolls 44.

The second pull roll 44 can then be adjustably secured to the frame member 24 by a pivoting plate assembly 344 attached to the frame member 24 opposite the pull rolls 44. An identical assembly 344 is also secured to the opposite end of the second pull roll 44 on the opposite frame member 22. As best shown in FIG. 7, the plate assembly includes a central shaft 346 extending through an opening 347 in the frame member 24. The central shaft 346 rotatably supports a pair of mounting plates 348. The mounting plates 348 are mounted to the shaft 346 in a staggered configuration, such that one of the plates 348 is mounted closer to the frame member 24 than the second plate 348. Each mounting plate 348 includes a shaft opening 350 disposed adjacent one end and a roll mounting opening 352 spaced opposite the shaft opening 350. To secure the plates 348 to the shaft 346, the shaft opening 350 and each plate 348 is positioned around the central shaft 346 and retained thereon by a locking member 354 positioned around the shaft 346 against the outermost plate 348 opposite the frame member 24. The locking member 354 retains the plates 348 on the shaft 346 such that each plate 348 can pivot or rotate with respect to the shaft 346.

To assemble the plate assembly 344, once the second pull rolls 44 are positioned on top of the first pull rolls 44 within the channel 328, each of the mounting plates 348 is positioned on the shaft 346. As the plates 348 are positioned on the shaft 346, the mounting opening 352 in each mounting plate 348 is positioned around the hub 146 of each second pull roll 44. The plates 348 are then secured to the central shaft 346 with the locking member 354, and the hubs 146 are secured to the mounting members 348 such that the plates 348 and second pull rolls 44 are integrally attached to one another.

The mounting openings 352 each include a bearing 356 that contacts and engages the hub 146 to rotatably secure the hub 146 within the opening 352. Opposite the second roll 44, the hub 146, if not secured to the slip clutch mechanism 142, can then be secured to a mounting member 358 extending outwardly from the plate 348 to laterally secure the hub 146 and second roll 44 between the frame members 24 and 22. The bearings 356 are releasably positioned within the openings 352 by a locking ring 360 positioned in a recess (not shown) extending around the circumference of the bearing 356. The ring contacts the edge of the mounting opening 352 to properly position the bearing 356 within the opening 352, and is secured thereto by a number of bolts (not shown) inserted into the mounting plates 348 around the periphery of the bearing 356 to engage and hold the ring 360 against the plates 348.

During operation, it often becomes necessary to adjust the spacing between the first and second pull rolls 44 depending on the particular operating conditions of the machine 20. Therefore, the plate assembly 344 connected to the second pull rolls 44 is adapted to be vertically movable with regard to the first pull rolls 44 in order to vary the distance between the respective pull rolls 44. The distance can be adjusted through the use of a biasing mechanism 362 connected to each plate 348 and to the frame member 24. The mechanism 362 includes a pair of springs 364 connected to each of the plates 348 opposite the shaft 346. The springs 364 can be gas springs, compression springs, die springs or any other type of suitable spring, and are connected opposite the plates 348 to a pair of mounting blocks 366 fixedly disposed beneath the plate assembly 344 on each side of the frame member 24. The springs 364 are mounted to the blocks 366 such that the springs 364 push the mounting plates 348 and second pull rolls 44 upwardly away from the first pull rolls 44.

Each mounting plate 348 also includes a vertical cylindrical recess 368 disposed within the plate 348 above the point of attachment of the plate 348 to the spring 364. Each recess 368 is adapted to receive a plug member 370. The plug member 370 is a spring or spring-like member, such as a conventional spring, a die spring, or an elastomeric member, partially received within the recess 368 and is attached to one end of a cable 372 that extends downwardly from the plug member 370 through a slot 374 formed in the end of the plate 348 between the recess 368 and the bottom of the plate 348. The cable 372 engages a pulley 376 rotatably mounted adjacent the block 366 which directs the cable 372 inwardly toward the interior of the frame member 24. The cable 372 then engages a second pulley 378 disposed within a slot 380 cut out of the frame member 24. The cable 372 winds around the pulley 378 and passes through the slot 380 in the frame member 24 into engagement with a winding mechanism (not shown). The winding mechanism can comprise a disc having a pair of openings in the disc that are adapted to receive one end of each cable 372 in order to releasably retain the cables 372 in engagement with the disc. The disc is operably connected to an electronically programmable motor (not shown), such as a servo motor, that is capable of rotating the disc to incrementally wind the cables 372 onto the disc. By winding the cables 372 onto the disc, the length of each cable 372 shortens, consequently pulling the plug members 370 and mounting plates 348 downwardly around the shaft 346. By pulling the plates 348 downwardly, the distance between the second pull rolls 44 and first pull rolls 44 is decreased against the bias of the springs 364. In this manner, by selectively adjusting the lengths of cable 372 wound onto the disc, an operator can selectively adjust the position of the second pull rolls 44 with respect to the first pull rolls 44 during the operation of the machine 20 to accommodate the various operating conditions for the machine 20. Also, by unwinding the cables 372 from the disc, the springs 364 are allowed to push the plates 348 and second rolls 44 away from the first rolls 44.

Various alternatives are contemplated as being within the scope of the following claims which particularly pointing out and distinctly claiming the features regarded as the invention.

I claim:

1. An improved laminating machine including a pair of upstanding frame members, a number of upper and lower rolls extending between the frame members and a drive system for operating the rolls, the improvement comprising:

a pair of slots in each frame member, each slot including an entrance opening on a side of the frame member, the entrance opening including a recess, and a downwardly extending portion having an inwardly extending annular shoulder that defines a lower roll retaining portion; and an upper roll positioning mechanism including a pair of plates pivotally mounted to a central shaft extending from the frame members, each plate including a roll mounting opening in which are mounted ends of the upper rolls, and an adjustment mechanism operably connected to the plates to adjust the position of the upper rolls with respect to the lower rolls.

2. The improved laminating machine of claim 1 wherein the adjustment mechanism includes a pair of springs, one mounted to each plate and to the frame member opposite the plate and operable to urge the plates and upper rolls away from the lower rolls.

3. The improved laminating machine of claim 2 wherein the adjustment mechanism includes a winding mechanism connected to the plates and used to urge the plates and upper rolls downwardly towards the lower rolls against the bias of the springs.

4. The improved laminating machine of claim 3 wherein the winding mechanism includes a programmable motor to precisely control the movement of the plates.

5. The improved laminating machine of claim 4 wherein a pair of cables are secured to the motor and to the plates and are retracted by the motor to move the plates.

6. An improved laminating machine including a pair of upstanding frame members, a number of pull rolls extending between the frame members and a drive system for operating the pull rolls, the drive system including a motor and a belt connected between the motor and at least one of the pull rolls, the improvement comprising:

a second belt connected between a stationary roll and the at least one pull roll; and a belt inverter positioned between the stationary roll and the at least one pull roll in contact with the second belt to divert portions of the second belt to drive the stationary roll and the at least one pull roll rotate in opposite directions.

* * * * *